June 15, 1926.
N. A. CURTISS
TOY VEHICLE
Filed Sept. 18, 1924
1,588,876
2 Sheets-Sheet 1
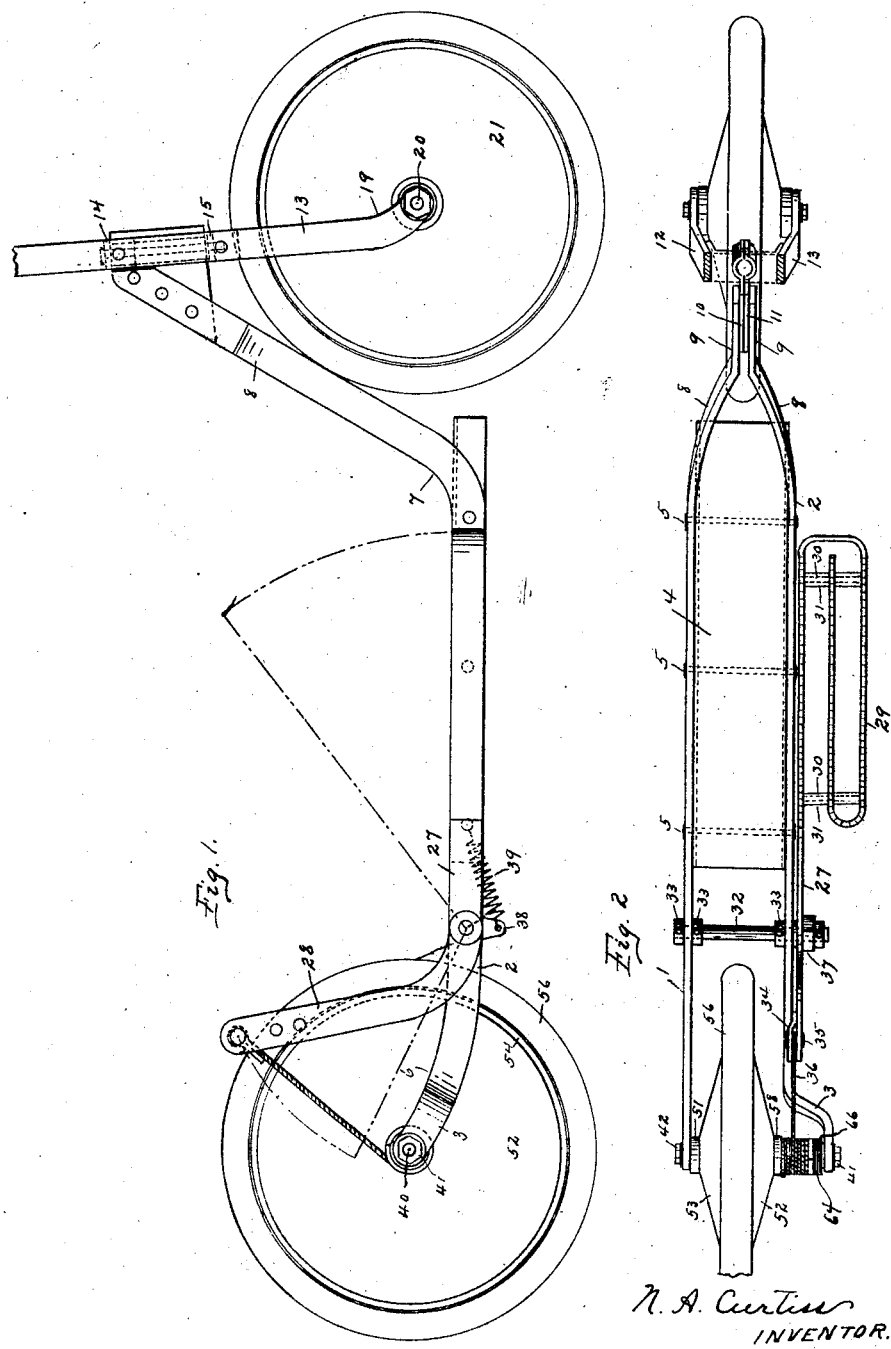

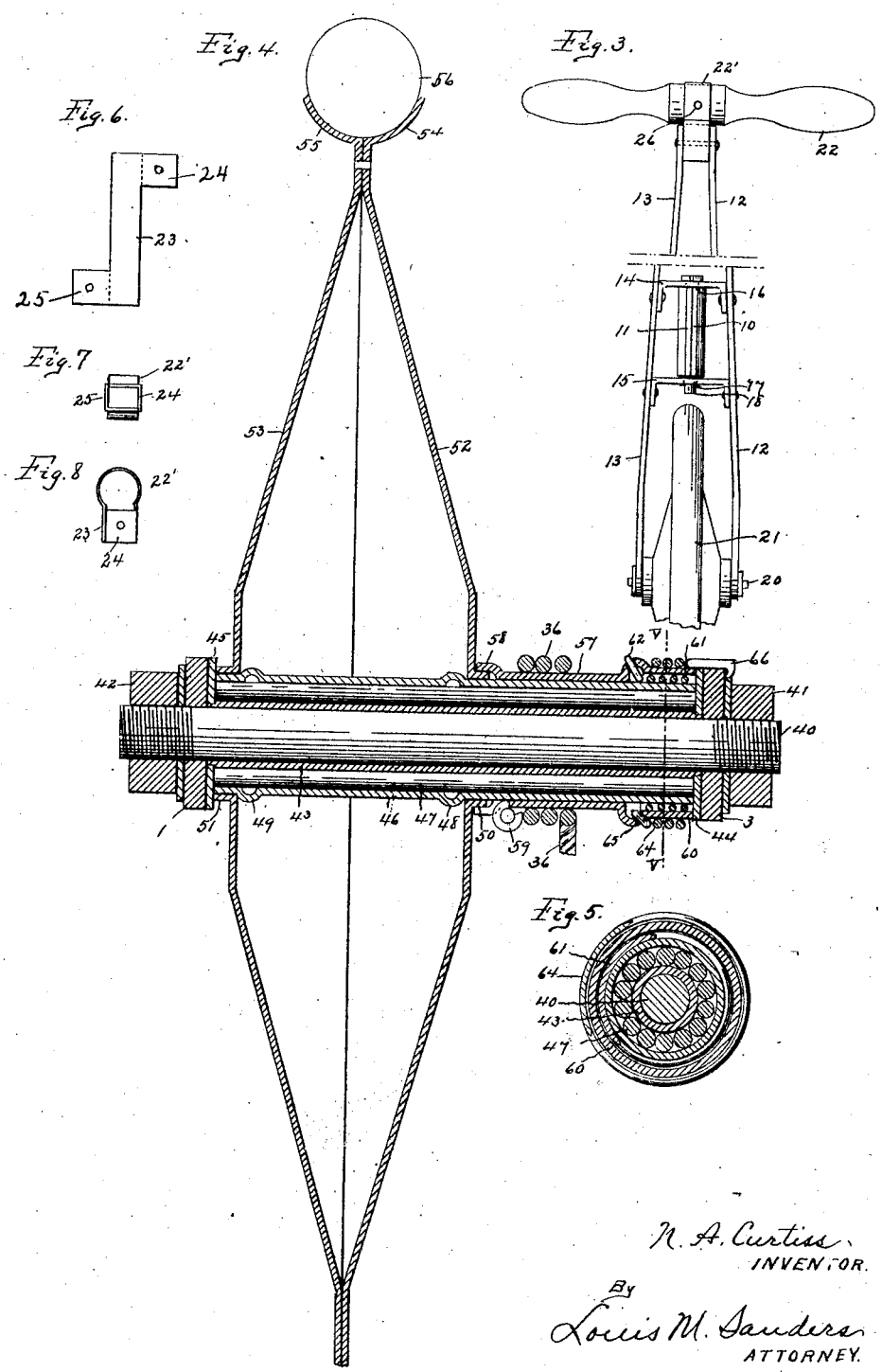

Patented June 15, 1926.

1,588,876

UNITED STATES PATENT OFFICE.

NATHAN A. CURTISS, OF BERWYN, ILLINOIS, ASSIGNOR TO ALBERT R. WINANS, OF RAMSEY, NEW JERSEY.

TOY VEHICLE.

Application filed September 18, 1924. Serial No. 738,438.

The purpose of the present invention is to improve the general construction of toy vehicles and particularly the driving mechanism in the way of simplifying the clutch devices used therein, and also to provide a special form of roller bearing for the driving wheel.

A further feature is in an improvement in the form of the chassis and in the support for the driving pedal so as to afford a more direct action between the end of the pedal and the driving clutch mechanism than is usual.

In the accompanying drawing forming a part hereof,

Fig. 1 illustrates in side elevation the improved form of vehicle.

Fig. 2 is a plan view of the same.

Fig. 3 is a partial front elevational view of the driving fork.

Fig. 4 is a sectional view of the driving wheel, its clutch and roller bearing mechanism.

Fig. 5 is a transverse sectional view taken on line V—V of Fig. 4.

Fig. 6 is a plan view of the support blank before it is formed.

Fig. 7 is a bottom plan view of the same, after being bent into shape.

Fig. 8 is a side elevational view of the same.

The chassis of the vehicle is made of the two side frames 1, and 2 which are of substantial symmetrical contour, with the exception that the frame 2 has its rear end offset as at 3 to give sufficient space between the rear ends of the two members 1, and 2 to receive the rear axle and its parts.

The two members 1, and 2 are rigidly secured together by means of a spacing board 4 which consists of a strip of sheet metal having its side edges flanged downwardly and secured to the side members by cross bolts or rivets 5 which pass through the side members 1, and 2 and the flanges of the board 4.

The rear ends of the two members 1, and 2 are upwardly cambered as at 6 to produce the under slung effect as shown in Fig. 1, and the forward ends of the side members are upwardly bent as at 7, inwardly curved toward each other, as at 8, and the extreme upper ends are bent parallel to each other, as at 9 and have riveted firmly between them two plates 10, and 11, which form the king pin bearing.

The steering fork consists of two members 12, and 13, connected together by braces 14, and 15 riveted to the fork members as shown and provided with apertures 16 and 17 to receive a king pin 18 passing through the bearing in the plates 10, and 11.

The lower ends of the two members 12, and 13 are forwardly cambered, as at 19, and the forward axle 20 of a wheel 21 is secured therein in any preferred manner. The steering handle 22 is secured to the upper ends of the fork members by means of the handle support 22'.

This handle support is shown as formed from a sheet metal blank 23, having two L-shaped ends 24, and 25 with the middle section of the blank wrapped around the middle of the handle and the L-shaped ends 24, and 25 are formed into a square and fitted between the upper ends of the fork members and riveted in place.

A rivet 26 also passes through the central portion of the support and through the handle so as to rigidly secure the parts together. This form of steering fork and its connection with the forward end of the chassis frame serves as a very convenient and positive connection for the steering wheel with plenty of freedom of movement.

A driving pedal 27 consists of a strip of metal of suitable width and thickness to give it the requisite strength, its rear end being upwardly bent to form an arm 28 while its forward end is bent around into a sort of flattened coil, as at 29, to give a broad flat bearing surface for the foot of the operator.

In order to stiffen this part of the pedal, cross rivets 30 and spacing thimbles 31 may be provided between the convolutions of the pedal. The pedal 27 is mounted upon a shaft 32 held in bearings in the side frame members 1, and 2 immediately forward of the rear driving wheel. Collars 33 are pinned to the shaft 32 to secure it against endwise movement, but permit a free rotary or oscillating movement of the same.

The upper rear end of the pedal is provided with a bearing brace 34 riveted in place with its upper end spaced away from the upper end of the arm 28, and provided with a cross pin 35 to which the driving cable 36 is connected, said driving cable leading down to and wrapped around the hub of the rear driving wheel as more fully hereinafter described.

The pedal hub 37, by which the pedal 27 is mounted upon the shaft 32, is provided with a downwardly extending arm 38, from which a spring 39 extends forwardly and is connected with one of the cross rivets or bolts 5. The tendency of one spring is to elevate the pedal 27 into the dotted line position shown in Fig. 1 so that when the pedal is depressed the spring will be under tension and restore the pedal to its elevated position when the pressure on the same is relieved.

The driving connections with the rear wheel will now be described. The axle 40 has its ends screw threaded and provided with the nuts 41, and 42 securing it in place between the rear end of the chassis member 1 and the offset end 3 of the member 2.

Mounted upon the axle, between the chassis members, is a bushing member 43 each end of which has a washer like head 44, and 45 which is fitted thereon after the part supported upon the bearing are assembled. The length of the bushing is such as to fill the space between the chassis members so that when the nuts 41, and 42 are screwed against the side members 1, and 3 they become rigidly connected to the bushing.

The wheel hub 46 is tubular and of an internal diameter sufficient to admit between it and the outer surface of the outer bushing 43 a series of rollers 47, thereby forming a roller bearing for the hub upon the bushing between the heads 44, and 45.

The hub 46 is provided with circumferential corrugations 48, and 49 against which on each side are flanges 50, and 51 which surround the central aperture of the wheel discs 52, and 53. These flanges are forced on to the hub by pressure to form a tight fit and if deemed desirable they may be electrically welded to the hub.

The wheel discs 52, and 53 are dished toward each other and may be riveted or spot welded at their points of contact. Their outer margins are curved as shown, to form a groove as at 54, and 55 to receive a rubber tire 56.

From the foregoing description it will be seen that the wheel will revolve freely with its hub 46 bearing upon the rollers 47, which in turn roll freely upon the axle bushing 43.

The right hand end of the hub 46 projects a considerable distance beyond the face of the adjacent disc flange 50, and upon this extended end is mounted a driving mechanism which consists of the following members: A cable drum 57 is mounted upon the extended end of the hub to freely rotate thereon, and the inner end of the drum is flared outwardly, as at 58, to overlap and enclose the disc flange 50 above referred to.

A portion of the inner end of this outwardly flared part is cut away and rolled over to form a clamping ring 59, by which one end of the cable 36 is secured to the drum. This cable is coiled around the drum several times, and as above described, its other end is connected to the outer end of the pedal arm 28.

The outer end of the cable drum 57 is enlarged, as at 60, so as to form a chamber between it and around the end of the hub. Within this chamber a clutch spring 61 is wound and connected to the drum, as at 62, by inserting its outwardly bent end through an aperture in the face of the drum.

The clutch spring 61 is of such an internal diameter as to hug the end of the hub 46, so that when the cable 36 is drawn off from the drum the result will be that the spring will be wound more tightly around the end of the hub and both hub and drum will revolve together; however, if the drum is rotated in the opposite direction, or the hub continues to rotate in a forward direction, while the drum remains stationary, the clutch connection between the spring 61 and the end of the hub will be relieved so that the wheel may continue to revolve independent of the drum.

When the cable 36 is drawn off from the drum 57 by the oscillation of the pedal 27, as above described, some means must be provided for winding it back upon the drum. In order to accomplish this there is provided a restoring spring 64 upon the outer end of the drum 60, connected at one end of the drum by insertion through an aperture 65, while the opposite end of the spring is bent outwardly, as at 66, to engage the upper edge of the chassis member, so that as the cable 36 is drawn from the drum 57 it will result in winding up the spring 64, and when the strain or pull upon the cable is relieved the spring 64 will rotate the drum in reverse direction to wind the cable back upon the drum.

Each downward stroke of the pedal 27 will cause the upturned arm 28 to unwind the cable 36 and simultaneously wind up the spring 63, but rotation of the drum in the act of unwinding the cable will cause the clutch spring 61 to grip more tightly around the hub 46, so that the oscillation of the pedal 37 will be converted into rotary movement of the driving wheel.

From the foregoing it will be seen that the device set forth will accomplish the results described in a very simple manner and by mechanism which is cheap to construct, easy to assemble, effective in operation, and not liable to disarrangement in actual use.

I claim:—

1. In a toy vehicle the combination with a pair of side frame members having their forward ends upwardly and forwardly inclined, and their rear ends curved upwardly, one of said rear ends being offset outwardly, a pair of bearing plates rigidly secured together between the forward ends of said frame at their upper extremities, a forked steering post rotatable between said plates, a steering wheel journalled in the fork of said post, a flanged metal foot board spacing said frame members apart, a driving wheel mounted directly between the straight and offset rear members, of a pedal shaft journalled in said frame and extending beyond the offset side of said frame, a pedal mounted upon the extending end of said shaft and resilient means for retaining said pedal in a normally raised position.

2. In a toy vehicle, the combination with a chassis, a steering wheel and a driving wheel respectively mounted at the front and rear ends of said chassis, of a cable drum alongside said driving wheel, a pedal lever mounted upon the chassis, said lever having a raised arm, a cable coiled around said cable drum and having one end secured thereto and its other end connected to the arm of said pedal, and a spring clutch connected to said cable drum and wrapped around the hub of said driving wheel, whereby the oscillation of said pedal lever will be communicated through said cable to said drum and thereby rotate said driving wheel.

3. In a toy vehicle, the combination with a chassis, and a driving wheel mounted thereon said driving wheel having a laterally extending hub, of a cable drum rotatively mounted upon said hub, and a coil spring clutch wrapped around said hub and having one thereof connected to said drum whereby the rotation of said drum in one direction will be communicated through said clutch to said driving wheel to rotate the same.

4. In a toy vehicle, the combination with a chassis, an axle rigidly secured in one end of said chassis, and a driving wheel rotatively mounted upon said axle, said driving wheel having a laterally extending hub, of a cable drum rotatively mounted upon said extended hub, and a clutch between said drum and said extended hub comprising a helical spring wrapped around said hub with one end secured thereto, whereby the rotation of said drum in one direction will be communicated through said spring clutch to said wheel.

5. In a toy vehicle, the combination with a chassis, and a driving axle rigidly secured in one end of said chassis, of a tubular bushing upon said axle between the members of said chassis, a driving wheel having a tubular hub mounted upon said axle and bushing, a plurality of bearing rollers between said hub and said bushing, and means for positively rotating said wheel in one direction.

6. In a toy vehicle, the combination with a chassis having an axle rigidly mounted therein, of a bushing between the members of the chassis frame and surrounding said axle, a driving wheel hub mounted upon said axle and bushing, and a plurality of rollers forming a roller bearing between said bushing and the interior of said hub.

7. In a toy vehicle, the combination with a chassis frame comprising a pair of side frame members spaced apart and rigidly connected together, an axle rigidly secured to the rear ends of said frame members, and a driving wheel mounted upon said axle, of a cable drum rotatively mounted upon the hub of said wheel, a one way clutch mechanism between said cable drum and said hub, a cable secured to said drum and wrapped therearound, means for intermittently drawing said cable from said drum to rotate said wheel in one direction, and a restoring spring connected to said cable drum and to a frame member for reversing the rotation thereof to rewind said cable thereon.

8. In a toy vehicle, the combination with a chassis frame comprising a pair of side frame members spaced apart and rigidly connected together, an axle rigidly secured to the rear ends of said frame members, and a driving wheel mounted to rotate upon said axle, of a cable drum rotatively mounted upon the hub of said wheel, said hub having an enlargement at one end thereof to form therewith and with said hub an enclosed chamber, a coil spring encircling said hub within said chamber one end of said spring being connected to said drum to form a one way clutch, a cable secured to said drum and wrapped therearound, and means for intermittently drawing said cable from said drum whereby said clutch spring will engage said drum to rotate the same therewith.

9. In a toy vehicle, the combination with a chassis frame, a driving wheel mounted in said frame and a pedal lever pivoted to the side of said chassis frame and connected to said wheel to rotate the same, said pedal lever comprising an integral strip of flat metal bent into a flat coil to provide a surface bearing for the foot of the operator.

NATHAN A. CURTISS.